United States Patent
Yu et al.

(10) Patent No.: US 11,790,633 B2
(45) Date of Patent: Oct. 17, 2023

(54) IMAGE PROCESSING USING COUPLED SEGMENTATION AND EDGE LEARNING

(71) Applicant: Nvidia Corporation, Santa Clara, CA (US)

(72) Inventors: Zhiding Yu, Santa Clara, CA (US); Rui Huang, Santa Clara, CA (US); Wonmin Byeon, Santa Clara, CA (US); Sifei Liu, Santa Clara, CA (US); Guilin Liu, Santa Clara, CA (US); Thomas Breuel, Santa Clara, CA (US); Anima Anandkumar, Santa Clara, CA (US); Jan Kautz, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 250 days.

(21) Appl. No.: 17/365,877

(22) Filed: Jul. 1, 2021

(65) Prior Publication Data

US 2023/0015989 A1  Jan. 19, 2023

(51) Int. Cl.
| | |
|---|---|
| G06V 10/50 | (2022.01) |
| G06N 3/04 | (2023.01) |
| G06T 7/13 | (2017.01) |
| G06V 10/75 | (2022.01) |
| G06F 18/2413 | (2023.01) |

(52) U.S. Cl.
CPC .......... G06V 10/50 (2022.01); G06F 18/2413 (2023.01); G06N 3/04 (2013.01); G06T 7/13 (2017.01); G06V 10/758 (2022.01)

(58) Field of Classification Search
None
See application file for complete search history.

(56) References Cited

PUBLICATIONS

Chen, Liang-Chieh, et al. "Semantic image segmentation with task-specific edge detection using cnns and a discriminatively trained domain transform." Proceedings of the IEEE conference on computer vision and pattern recognition. 2016. (Year: 2016).*
Chen, Ke. "Adaptive smoothing via contextual and local discontinuities." IEEE Transactions on Pattern analysis and machine intelligence 27.10 (2005): 1552-1567. (Year: 2005).*
Zhang, Li, et al. "Dynamic graph message passing networks." Proceedings of the IEEE/CVF Conference on Computer Vision and Pattern Recognition. 2020. (Year: 2020).*

(Continued)

*Primary Examiner* — Michelle M Entezari Hausmann

(57) ABSTRACT

The disclosure provides a learning framework that unifies both semantic segmentation and semantic edge detection. A learnable recurrent message passing layer is disclosed where semantic edges are considered as explicitly learned gating signals to refine segmentation and improve dense prediction quality by finding compact structures for message paths. The disclosure includes a method for coupled segmentation and edge learning. In one example, the method includes: (1) receiving an input image, (2) generating, from the input image, a semantic feature map, an affinity map, and a semantic edge map from a single backbone network of a convolutional neural network (CNN), and (3) producing a refined semantic feature map by smoothing pixels of the semantic feature map using spatial propagation, and controlling the smoothing using both affinity values from the affinity map and edge values from the semantic edge map.

18 Claims, 8 Drawing Sheets

(56) References Cited

PUBLICATIONS

Xu, Danfei, et al. "Scene graph generation by iterative message passing." Proceedings of the IEEE conference on computer vision and pattern recognition. 2017. (Year: 2017).*

Chen, Liang-Chieh, et al. "Rethinking atrous convolution for semantic image segmentation." arXiv preprint arXiv:1706.05587 (2017). (Year: 2017).*

Wang, Zude, and Leixin Zhang. "Semantic segmentation of brain MRI based on U-Net network and edge loss." 2020 19th International Symposium on Distributed Computing and Applications for Business Engineering and Science (DCABES). IEEE, 2020. (Year: 2020).*

Geng, Qichuan, Zhong Zhou, and Xiaochun Cao. "Survey of recent progress in semantic image segmentation with CNNs." Science China Information Sciences 61 (2018): 1-18. (Year: 2018).*

Li, Guohao, et al. "Deepgens: Can gens go as deep as cnns ?. " Proceedings of the IEEE/CVF international conference on computer vision. 2019. (Year: 2019).*

Zhang, Lu, et al. "A bi-directional message passing model for salient object detection." Proceedings of the IEEE conference on computer vision and pattern recognition. 2018. (Year: 2018).*

Yu, Zhiding, et al. "Coupled Segmentation and Edge Learning via Dynamic Graph Propagation." Advances in Neural Information Processing Systems 34 (2021): 4919-4932. (Year: 2021).*

Zhang B, Xiao J, Jiao J, Wei Y, Zhao Y. Affinity attention graph neural network for weakly supervised semantic segmentation. IEEE Transactions on Pattern Analysis and Machine Intelligence. May 25, 2021;44(11):8082-96. (Year: 2021).*

Jiang D, Qu H, Zhao J, Zhao J, Liang W. Multi-level graph convolutional recurrent neural network for semantic image segmentation. Telecommunication Systems. Jul. 2021;77:563-76. (Year: 2021).*

Zhao, Jia-Xing, et al. "EGNet: Edge guidance network for salient object detection." Proceedings of the IEEE/CVF international conference on computer vision. 2019. (Year: 2019).*

Tu, Zhengzheng, et al. "Edge-guided non-local fully convolutional network for salient object detection." IEEE transactions on circuits and systems for video technology 31.2 (2020): 582-593. (Year: 2020).*

Wu, Zhe, Li Su, and Qingming Huang. "Stacked cross refinement network for edge-aware salient object detection." Proceedings of the IEEE/CVF international conference on computer vision. 2019. (Year: 2019).*

Takikawa T, Acuna D, Jampani V, Fidler S. Gated-scnn: Gated shape cnns for semantic segmentation. InProceedings of the IEEE/CVF international conference on computer vision 2019 (pp. 5229-5238). (Year: 2019).*

Pinto F, Romanoni A, Matteucci M, Torr PH. SECI-GAN: Semantic and Edge Completion for dynamic objects removal. In2020 25th International Conference on Pattern Recognition (ICPR) Jan. 10, 2021 (pp. 10441-10448). IEEE. (Year: 2021).*

Ding, et al.; "Boundary-Aware Feature Propagation for Scene Segmentation"; ICCV; arXiv:1909.00179v1; Aug. 31, 2019; 11 pgs.

Chen, et al.; "Semantic Image Segmentation with Task-Specific Edge Detection Using CNNs and a Discriminatively Trained Domain Transform"; CVPR; arXiv:1511.03328v2; Jun. 2, 2016; 14 pgs.

Liu, et al.; "Learning Affinity via Spatial Propagation Networks"; NIPS; arXiv:1710.01020v1; Oct. 3, 2017; 14 pgs.

Yu, et al.; "Learning a Discriminative Feature Network for Semantic Segmentation"; CVPR; arXiv:1804.09337v1; Apr. 25, 2018; 10 pgs.

Takikawa, et al.; "Gated-SCNN: Gated Shape CNNs for Semantic Segmentation"; ICCV; arXiv:1907.05740v1; Jul. 12, 2019; 10 pgs.

* cited by examiner

IMAGE PROCESSING USING COUPLED SEGMENTATION AND EDGE LEARNING

TECHNICAL FIELD

This application is directed, in general, to extracting information from input images and, more specifically, to segmentation and edge learning from input images.

BACKGROUND

Visual computing systems are directed to using computers to gain a high-level of understanding from images and use the understanding to automate tasks typically performed by a human's visual system. For example, a computer vision system can include processing and analyzing images to extract information and use the information to make decisions and perform tasks. Processing and analyzing an image to obtain information often uses models constructed with the aid of learning systems.

Semantic segmentation and semantic edge detection are examples of processes used to extract image information. Semantic segmentation and semantic edge detection are central perception problems to be understood for computer vision systems. Semantic segmentation involves applying semantic labels to the pixels of an image and edge detection involves finding the boundaries for the objects of the image. Both are label problems that include assigning a label to a pixel, or even multiple labels for edge detection, as a prediction. A learning system using a convolutional neural network (CNN) is often used to make a prediction for the pixel labels.

SUMMARY

In one aspect, the disclosure provides a processor for coupled segmentation and edge learning. In one example, the processor includes: (1) a backbone network configured to generate, from an input image, a semantic feature map, an affinity map, and a semantic edge map, and (2) a dynamic graph propagation (DGP) layer configured to produce a refined semantic feature map by smoothing pixels of the semantic feature map, wherein the DGP layer uses affinity values from the affinity map and edge values from the semantic edge map to control the smoothing.

In another aspect, the disclosure provides a method for coupled segmentation and edge learning. In one example, the method includes: (1) receiving an input image, (2) generating, from the input image, a semantic feature map, an affinity map, and a semantic edge map from a single backbone network of a convolutional neural network (CNN), and (3) producing a refined semantic feature map by smoothing pixels of the semantic feature map using spatial propagation, and controlling the smoothing using both affinity values from the affinity map and edge values from the semantic edge map.

In yet another aspect, the disclosure provides a system. In one example, the system includes: (1) an image processor configured to perform a visual task based on at least one refined semantic map from an input image, and (2) a coupled segmentation and edge learning (CSEL) processor configured to produce the at least one refined semantic map by smoothing pixels of a semantic feature map using a dynamic graph propagation (DGP) layer, wherein the DGP layer is a learnable recurrent message passing layer that uses both affinity values and edge values extracted from the input image to control the smoothing.

BRIEF DESCRIPTION

Reference is now made to the following descriptions taken in conjunction with the accompanying drawings, in which.

DETAILED DESCRIPTION

Figure 1:
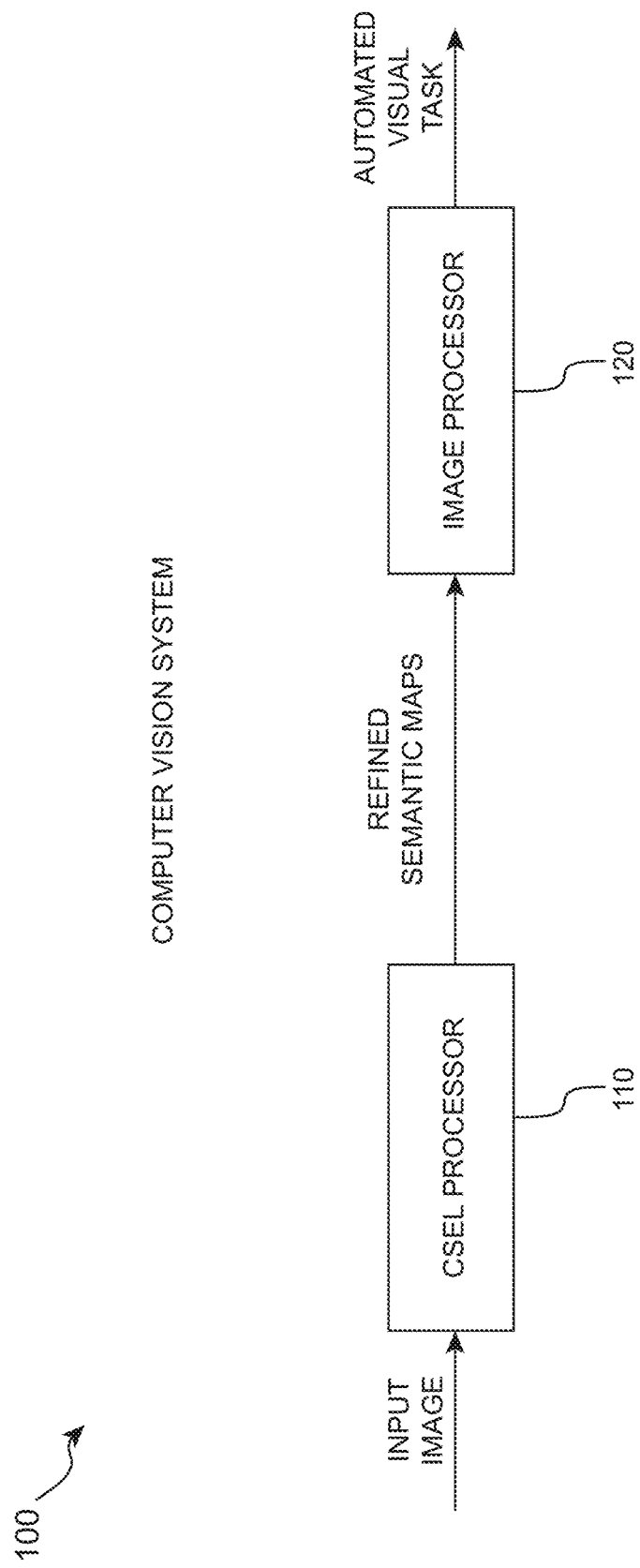
FIG. 1 illustrates a block diagram of an example of a computer vision system constructed according to the principles of the disclosure.

As noted above image segmentation and edge detection are important perception problems when processing images. These two problems are related since a segmentation contour makes a closed boundary of a region. Edges, however, do not always form closed contours. Nevertheless, the disclosure recognizes that edge detection can be beneficial to improve segmentation since edges can provide important pairwise similarity cues for segmentation.

The disclosure provides a principled, end-to-end learning framework that unifies both semantic segmentation and semantic edge detection. The learning framework enables multi-tasking to produce high quality edge and segmentation using a single backbone network and with mutual improvement. A learnable recurrent message passing layer is disclosed where semantic edges are considered as explicitly learned gating signals to refine segmentation. The recurrent message passing layer is referred to as a dynamic graph propagation (DGP) layer and improves dense prediction quality by finding compact structures for message paths. The DGP layer effectively transforms sparse edge signals into dense region-level ones to interact with segmentation. The DGP layer simultaneously leverages segmentation information to refine edges, and in turn integrate the refined edges as gate input for message passing to refine segmentation. A double gate design is disclosed by gating the output from message passing and refining segmentation with edge signals. The dynamic one-way connection formulation in the DGP layer with the double gating provides an improved coupling between segmentation and edge learning compared to current systems.

The disclosed double gating mechanism are affinity and edge gates that are used to influence segmentation. The DGP layer uses max-pooling of affinity values as gates to select the neighboring pixel for message passing. The DGP conducts message passing sweeps in multiple directions, such as left to right, right to left, top to bottom, and bottom to top. The output from the message passing is then gated with an edge signal to refine segmentation. Using maximum affinity values simplifies the typically required normalization in spatial propagation networks and improves dense prediction quality by finding compact structures for the message paths. The DGP layer advantageously uses edges to guide segmentation through message passing to influence long range relations.

A CSEL processor is disclosed that includes the DGP layer and a backbone network. The backbone network produces, from an input image, a semantic feature map, an affinity map, and a semantic edge map. The semantic feature map and the semantic edge map are initial predictions that are refined using the DGP layer. For example, the DGP layer produces a refined semantic feature map by smoothing pixels using neighboring pixels and using affinity values from the affinity map and edge values from the semantic edge map to control the smoothing.

Equation 1 provides an example of an algorithm to provide a framework for the DGP layer to perform message passing on a dynamic graph structure by picking neighboring pixels with the maximum affinity value.

$$h_{i,t}=(1-\sigma(\hat{p}_{i,t}^{k*}))\odot f_{i,t}+\sigma(\hat{p}_{i,t}^{k*})\odot h_{k*,t-1} \qquad \text{Equation 1}$$

Equation 1 is the summation of two element wise products, wherein $h_{i,t}$ and $f_{i,t}$ denote the hidden state and the feature of the i th pixel (p) located at recurrence $t^1$ of the refined semantic feature map H and semantic feature map F, respectively. FIG. 6 provides an example of the denotations. The sigmoid function is used with the pixel values as a raw gating activation without normalization. k* is defined by Equation 2, wherein N(i,t) is the set of neighbors of pixel (i; t).

$$k^* \triangleq \underset{k\in N(i,t)}{\operatorname{argmax}} \sigma(\hat{p}_{i,t}^k) \qquad \text{Equation 2}$$

Coupling of the edge prediction with segmentation is incorporated into the DGP layer with a double-gate framework defined by Equation 3 below.

$$h_{i,t}=(1-\sigma(\hat{p}_{i,t}^{k*})\odot\sigma(e_{i,t}))\odot f_{i,t}+\sigma(\hat{p}_{i,t}^{k*})\odot\sigma(e_{i,t})\odot h_{k*,t-1}$$

In Equation 3, $e_{i,t}$ is defined by Equation 4.

$$e_{i,t} \triangleq W_e * E[i-1: i+1, t-1: t+1] \qquad \text{Equation 4}$$

In Equation 4, W is a convolution kernel, $e_{i,t}$ is the edge gating signal that can be obtained via a convolution on the K-channel edge activation map E, such as a 3×3 convolution, which outputs a vector e sharing the same dimension (e.g., 128 channels) as ^p. Accordingly, the edges are able to actively influence segmentation via edge-sensitive gating on message passing. As shown in FIG. 1, the refined segmentation activation after the DGP layer can serve to regularize shapes of the edge prediction. Thus, a K-channel edge regularization feature is output $F_m$ using a 1×1 convolution, followed by another 3×3 convolution to fuse with E to produce a refined edge map E*.

FIG. 1 illustrates a block diagram of an example of a computer vision system 100 constructed according to the principles of the disclosure. The computer vision system 100 processes images and utilizes computers to understand the images and automate visual tasks that are typically performed by humans. The image processing includes extracting data from the images and using the extracted data for the automated visual tasks. The computer vision system 100 can be, can be included with, or used with various systems, such as an autonomous or semiautonomous driving systems, a smart home, medical artificial intelligence (AI) systems, robotics, AI city, etc.

Considering the autonomous or semiautonomous driving system, the processing images received from sensors in a vehicle can be performed by one or more system on a chip (SoC) in a controller, such as an autonomous vehicle control board (AVC). The controller can also include other processors and circuit functionality, such as transceivers, modems, one or more central processing units (CPUs) and graphics processing units (GPUs). The processing can include, for example, analyzing the images for objects and vehicles moving in front of the camera, determining a distance to the object or vehicle, and determining if a road sign was captured by the camera. This processing can lead to other analyzations and decisions by the controller and other vehicle systems, such as if a stop sign were detected and the vehicle should come to a stop.

The computer vision system 100 includes a processor 110 that couples segmentation and edge learning and a second processor 120 that processes images. The first and second processors 110, 120, can be a single processor or different processors. The first processor 110 can be a CSEL processor and the second processor 120 can be an image processor and will be referred to as such in the following discussion.

The computer vision system 100 can include additional components, such as one or more memories (data storage) and one or more interfaces. The memories can store a series of operating instructions that direct the operation of the first and/or second processors 110, 120, including code representing the algorithms for producing refined semantic maps as disclosed herein. For example, the one or more memories can store code corresponding to one or more of the equations disclosed herein. The one or more interfaces can receive the images and provide the refined semantic feature map and/or refined semantic edge map.

Figure 2:
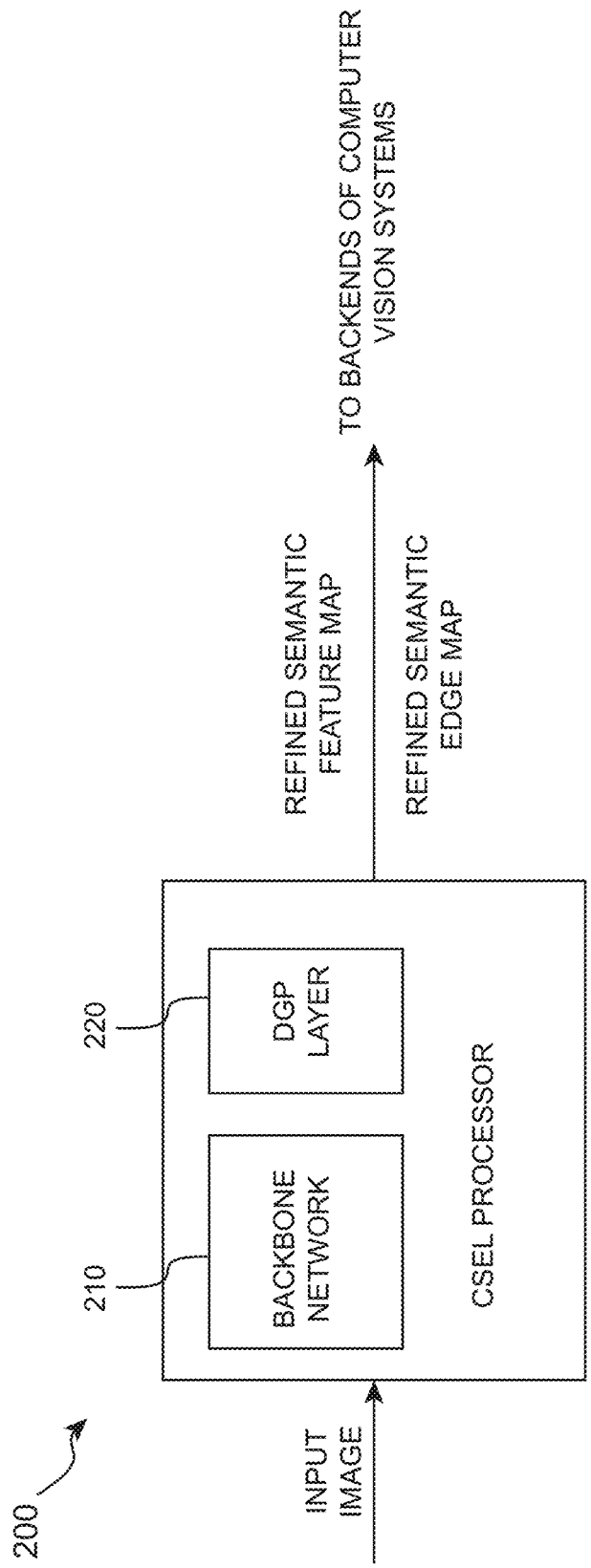
FIG. 2 illustrates a block diagram of an example of a coupled segmentation and edge learning (CSEL) computing device constructed according to the principles of the disclosure.
Figure 3:
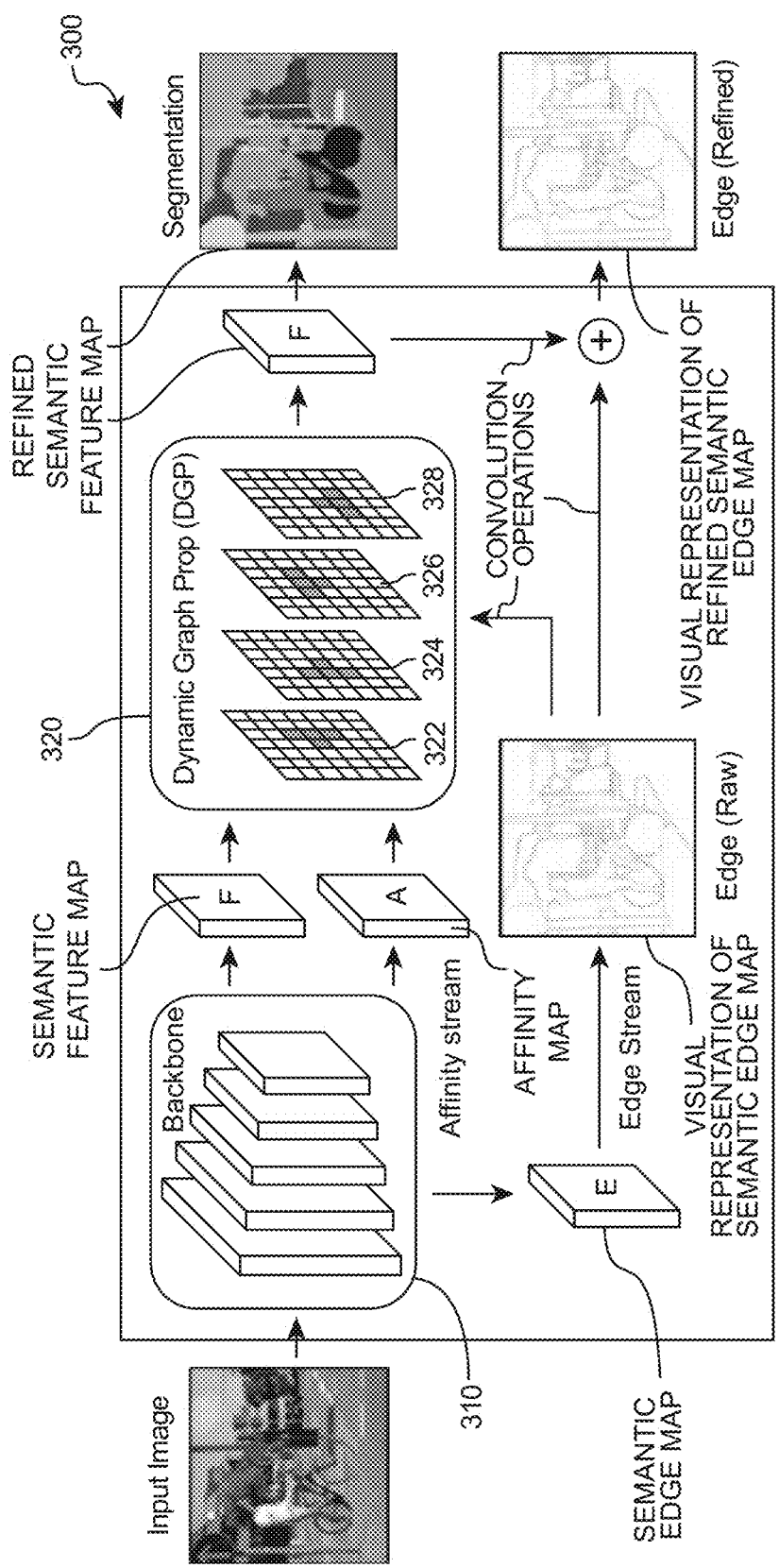
FIG. 3 illustrates a component diagram of an example of a CSEL computing device constructed according to the principles of the disclosure.

The CSEL processor 110 provides a multitasking learning framework that produces refined semantic maps at a high quality utilizing a single backbone network. The CSEL processor 110 receives input images and produces the refined semantic maps therefrom to utilize for processing the input images. The input images can be from a photo, a video, a scanner, a medical scanning device, etc. The refined semantic maps include both a refined semantic feature map and a refined semantic edge map for an input image. The refined semantic feature and edge maps provide segmentation and edge predictions that can be utilized by the computer vision system 100 for automated visual tasks. FIGS. 2-3 provide examples of the CSEL processor 110.

The image processor 120 uses at least one of the refined semantic feature map or refined semantic edge map to perform an automated visual task. The image processor 120 can utilize both of the refined semantic feature maps to perform an automated task. Examples of the automated visual task includes object and image detection, localization, mapping, etc. The task or function performed by the image processor 120 can vary depending on the computer vision system 100.

Figure 4:
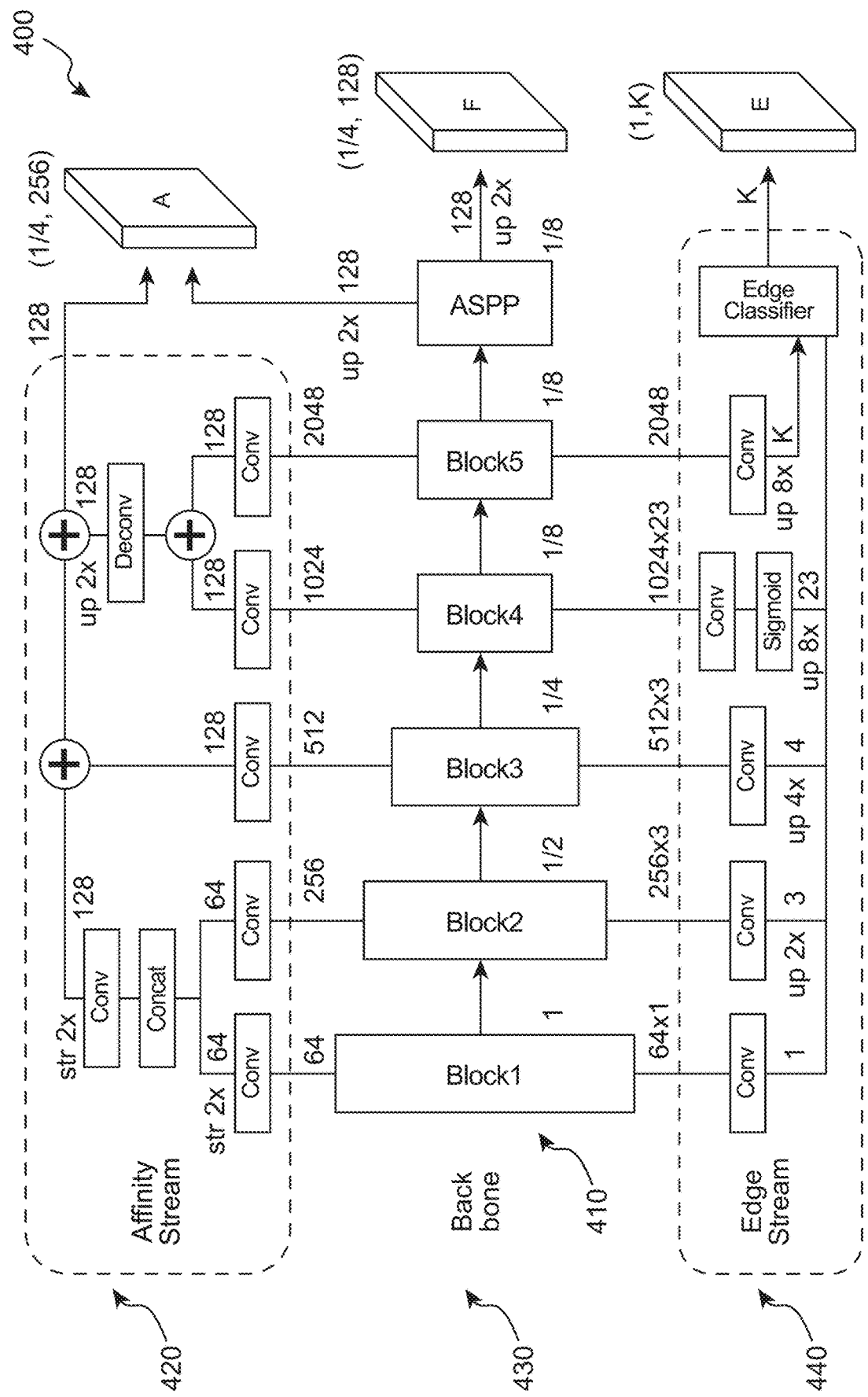
FIGS. 4-5 illustrate block diagrams of examples of different architectures for a backbone network of a CSEL computing device constructed according to the principles of the disclosure.
Figure 5:
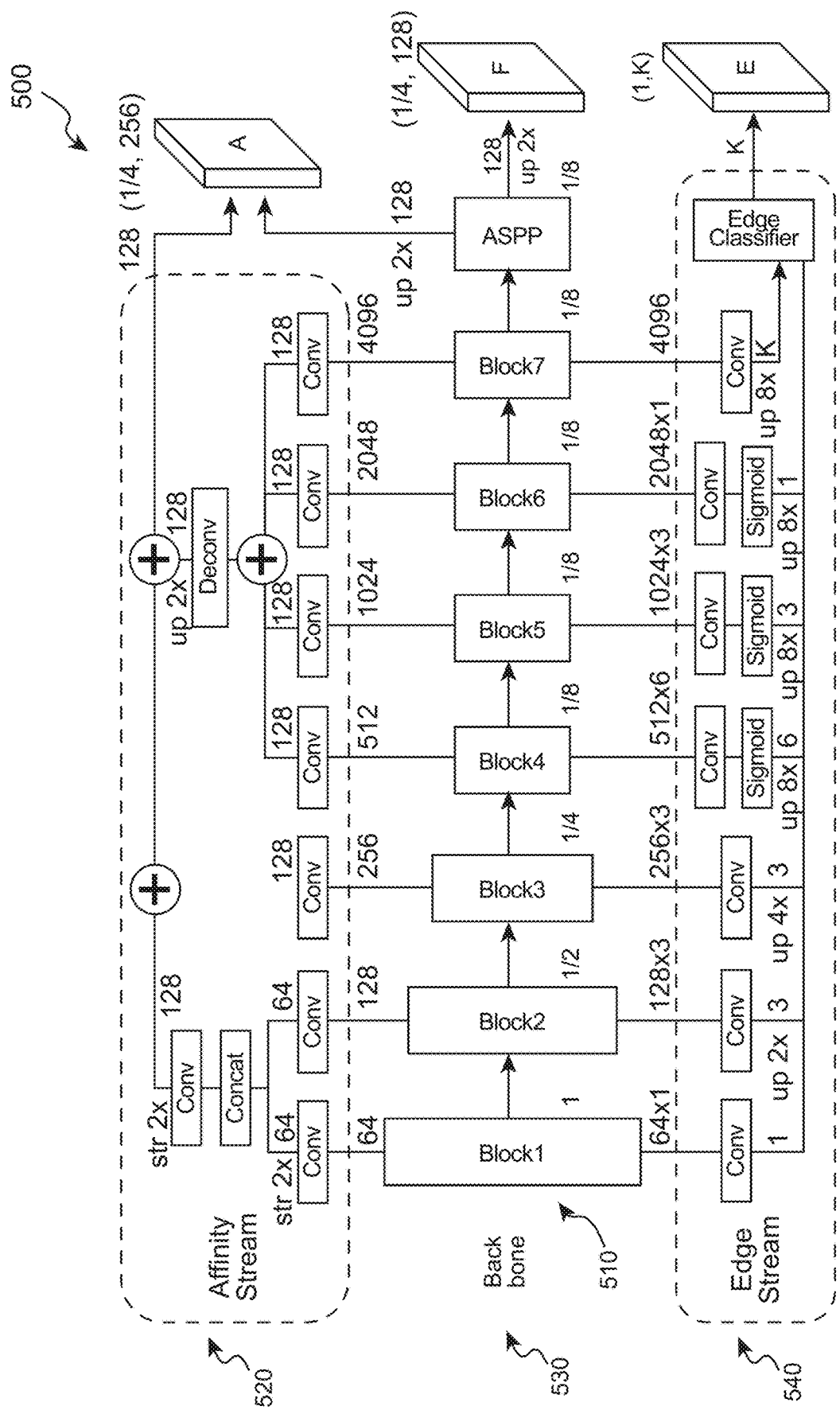

FIG. 2 illustrates a block diagram of an example of a CSEL processor 200 constructed according to the principles of the disclosure. The CSEL processor 200 is a neural network that produces a refined semantic feature map and a refined semantic edge map from an input image. The refined semantic feature maps can be provided to the backends of computer vision systems, such as the image processor 120 of computer vision system 100, to use for segmentation and edge detection. The CSEL processor 200 can be, for example, a convolutional neural network (CNN) processor. The CSEL processor 200 includes a backbone network 210 that produces a semantic feature map, an affinity map, and a semantic edge map from the input image. FIGS. 4-5 provide an example of a backbone network.

In addition to the backbone network 210, the CSEL processor 200 includes a learnable recurrent message passing layer that uses the semantic feature map, the affinity map, and the semantic edge map as input to produce the refined semantic feature map and the refined semantic edge map. The recurrent message passing layer, referred to as a dynamic graph propagation (DGP) layer 220, produces the refined semantic feature map by smoothing pixels of the semantic feature map using affinity values from the affinity map and edge values from the semantic edge map to control the smoothing. The refined semantic feature map can then be combined with the semantic edge map to generate the refined semantic edge map. In some applications, the refined semantic feature map may be desired and generated without providing the refined semantic edge map.

FIG. 3 provides a diagram illustrating an example of a CSEL processor 300 constructed according to the principles of the disclosure. The CSEL processor 300 extracts segmentation and edge information from an input image and provides a refined semantic feature map. Additionally, the CSEL processor 300 can provide a refined semantic edge map. The CSEL processor 300 includes a backbone network 310 and a DGP layer 320.

The backbone network 310 includes three processing streams: a feature stream, an affinity stream, and an edge stream. The feature stream produces encoded semantic features from an input image. The encoded semantic features, provided as a semantic feature map, encodes segmentation information from the input image and is represented by "F" in FIG. 3. The affinity stream produces an affinity map that encodes the affinity of pairwise neighboring pixels of the input image. The edge stream produces a semantic edge map from the shared concatenation of dense side features and edge classification from the input image. The affinity map and the semantic edge map are represented by "A" and "E" in FIG. 3.

The backbone network 310 provides the semantic feature map, the affinity map, and the semantic edge map to the DGP layer 320. The DGP 320 receives the outputs from the three processing streams and uses learnable message passing to produce a refined semantic feature map for both segmentation and edge refinement. A visual representation of the semantic edge map is provided to illustrate the raw edges of the semantic edge map before refinement. In addition to being provided to the DGP layer 320, the semantic edge map is also summed with an output of the DGP layer 320, a refined semantic feature map, to provide the refined semantic edge map. The refined semantic feature map can also be provided for segmentation. A visual representation of the refined semantic feature map and the refined semantic edge map are also illustrated in FIG. 3. The refined semantic feature map and the refined semantic edge map can be provided to a backend of a computer vision system, such as the image processor 120 of FIG. 1.

The DGP layer 320 is a spatial propagation network having a two-dimensional recurrent network architecture that linearly propagates messages (memories) over the semantic feature map. The spatial propagation of the messages are in multiple directions. The DGP layer 320 includes four examples of a semantic feature map 322, 324, 326, 328, that illustrate spatial propagation in four directions to a center pixel. The four directions include: Right to Left (Mode R) 322, Left to Right (Mode L) 324, Top to Bottom (Mode T) 326, and Bottom to Top (Mode B) 328. Unlike some spatial propagation networks, the DGP layer 320 does not require normalization. Instead, the DGP layer 320 provides a framework where messages are passed on the dynamic graph structure by selecting neighboring pixels with the highest response—i.e., the signals having the greatest affinity values from the affinity map. The DGP layer 320 intuitively captures a compact structure, which presents an inductive bias that benefits segmentation by filtering out noisy prediction and following strong signals, which can be from neighboring pixels having the greatest affinity values. FIG. 6 provides an example of spatial propagation in the four different modes and using a neighboring pixel with the greatest affinity value.

The CSEL processor 300 is typically a CNN and providing the semantic edge map, the affinity map, and the semantic edge map to the DGP layer 320 are via convolution operations. Additionally, summing the refined semantic feature map with the semantic edge map is performed via convolution operations. The backbone network 310 can be constructed using different architectures that are configured to produce the three different maps via the different processing streams. For example, backbone network architectures from DeepLabv2, DeepLabv3, DeepLabv3+, and Dual-Attention Network can be used. FIGS. 4-5 provide example architectures of feature extraction networks of a CNN using standard backbones CASENet and WiderResNet-38, which can be used for the backbone network 320.

FIG. 4 provides a diagram illustrating an example of a backbone network 400 for a CSEL processor constructed according to the principles of the disclosure. The backbone network 400 utilizes a CASENet architecture. The backbone network 400 includes feature extraction layers, i.e., backbone 410, that provide three different processing streams denoted as affinity stream 420, feature stream 430, and an edge stream 440, that produce an affinity map (A), a semantic feature map (F), and a semantic edge map (E). The feature stream 430 corresponds to the backbone 410.

The backbone 410 has feature map resolutions of 1, ½, ¼ and ⅛ with respect to an input image. The resolution ⅛ corresponds to various segmentation networks in computer vision systems. Atrous spatial pyramid pooling (ASPP) layers with dilation rate [6; 12; 18; 24; 30; 36] are used to capture context information. In this example, the output channels are set to 128 to produce the semantic feature map. The semantic feature map can be used for direct segmentation prediction (baselines) or can be provided to a DGP layer, such as DGP layers 220 and 320, for producing a refined semantic feature map as shown in FIGS. 2-3.

The affinity stream 420 utilizes convolution layers (cony in FIG. 4) that aggregate cross-layer information of the backbone 410 and produces the affinity map that encodes the affinity of pairwise neighboring pixels of an input image. In example embodiments, the affinity stream 420 may only be used with the presence of a DGP layer, and the related baselines of the DGP layer. The affinity stream 420 provides a model of the similarity of pair-wise neighboring pixels and serves as an input to the gating signal in the DGP. Compared to edge stream 440, the affinity stream 420 seeks to capture coarser-level inter-pixel affinity with slightly deeper convolutions and higher dimensions. The resulting affinity map A is a 256 dimensional tensor concatenated by ASPP and the side convolutional feature maps from the affinity stream 420.

The edge stream 440 provides dense skip-layer features with abundant details that are combined with edge classification layer (edge classifier in FIG. 4) through shared concatenation to produce a semantic edge map. The edge stream 440 leverages detail information at multiple scales/levels with dense side connections. Advantageously, the edge stream 440 densely obtains side features from every sub-block residual modules compared to conventional streams having bottom blocks that only provide 1-channel side features. As such, the edge stream 440 produces side features with a total number of 31 dimensions. The edge stream 440 also applies sigmoid after side features with resolution ⅛ and removes sigmoid for side features with higher resolutions. Applying the sigmoid can greatly benefit edge training by stabilizing and preventing gradient explosions from dense skip connections and removing typical aliasing edge issues caused by upsampling/deconvolution to produce elegant smooth edges. Even without explicitly applying techniques such as edge alignment, the edge stream 440 is able to produce high quality edge predictions under noisy labels. Edge prediction of the edge stream 440 is multi-tasked alongside ASPP using 1×1 convolution on top of Res Block 5 of the backbone 410 to return K classes of coarse edge predictions. All side features of the edge stream 440 are upsampled together with the K-dimensional edge predictions to full image resolution and shared concatenation is applied. Side features are repetitively shared and concatenated with each class for K times, followed by a K-way 3×3 group convolution to produce semantic edges and the semantic edge map E.

FIG. 5 provides a diagram illustrating another example of a backbone network 500 for a CSEL processor constructed according to the principles of the disclosure. The backbone network 500 utilizes a WiderResNet-38 architecture. As with the backbone network 400 FIG. 4, the backbone network 500 includes feature extraction layers, i.e., backbone 510 that provide three different processing streams denoted as affinity stream 520, feature stream 530, and an edge stream 540, that produce an affinity map (A), a semantic feature map (F), and a semantic edge map (E). The feature stream 530 corresponds to the backbone 510.

The backbone 510 also covers feature map resolutions of 1, ½, ¼ and ⅛. ASPP layers with dilation rate [6; 12; 18; 24; 30; 36] are utilized to capture context information and the output channels are set to 128 to produce the semantic feature map. In contrast to the backbone 410, the backbone 510 includes additional resolution blocks for the resolution of ⅛. As noted with the backbone network 400, the semantic feature map can be used for direct segmentation prediction (baselines) or can be provided to a DGP layer for producing a refined semantic feature map as shown in FIGS. 2-3.

The affinity stream 520 utilizes convolution layers (conv in FIG. 5) that aggregate cross-layer information of the backbone 510 and produces the affinity map that encodes the affinity of pairwise neighboring pixels of an input image. The affinity stream 520 provides a model of the similarity of pair-wise neighboring pixels and provides an input to the gating signal in a DGP layer. In example embodiments, the affinity stream 520 may only be used with the presence of a DGP layer, and the related baselines of the DGP layer. Compared to edge stream 540, the affinity stream 520 captures coarser-level inter-pixel affinity with slightly deeper convolutions and higher dimensions. The resulting affinity map A is a 256-dimensional tensor concatenated by ASPP and the side convolutional feature maps from the affinity stream 520.

The edge stream 540 provides dense skip-layer features that are combined with edge classification layer (edge classifier in FIG. 5) through shared concatenation to produce a semantic edge map. The edge stream 540 leverages detail information at multiple scales/levels with dense side connections. Advantageously, the edge stream 440 densely obtains side features from every sub-block residual modules. As such, the edge stream 540 produces side features with a total number of 17 dimensions. The edge stream 540 applies sigmoid after side features with resolution ⅛ from Res Blocks 4, 5, and 6. Edge stream 540 is able to produce high quality edge predictions under noisy labels without explicitly applying edge alignment techniques. Edge prediction of the edge stream 540 is multi-tasked alongside ASPP using 1×1 convolution on top of Res Block 7 of the backbone 510 to return K classes of coarse edge predictions. All side features of the edge stream 540 are upsampled together with the K-dimensional edge predictions to full image resolution. Shared concatenation is also applied. Side features are repetitively shared and concatenated with each class for K times, followed by a K-way 3×3 group convolution to produce semantic edges and the semantic edge map E.

Figures 6A, 6B:
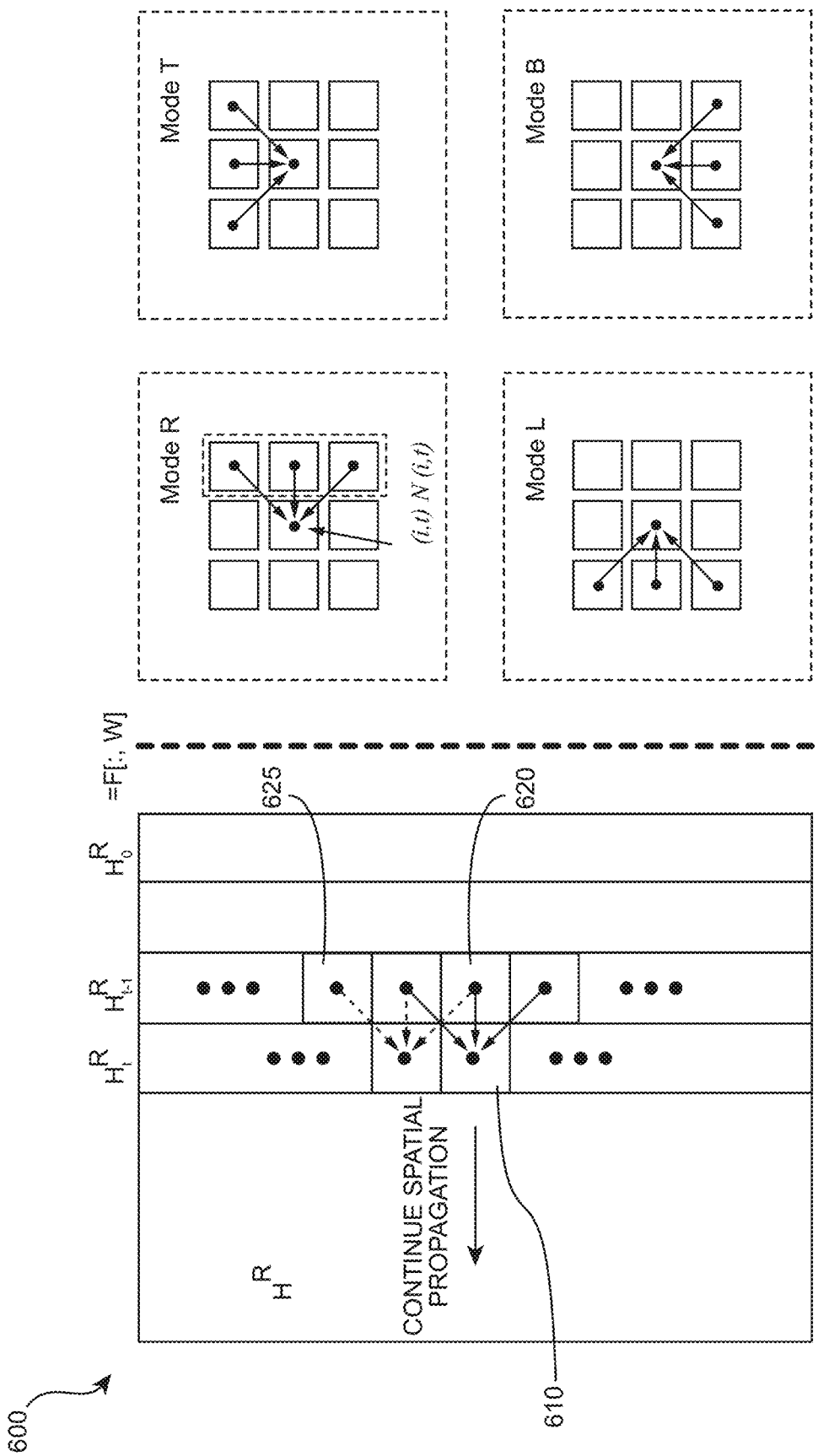
FIG. 6A illustrates a diagram of an example of spatial propagation carried out by a DGP layer according to the principles of the disclosure.
FIG. 6B illustrates four spatial propagation modes that can be carried out for smoothing a semantic feature map according to the principles of the disclosure.

FIG. 6A provides a diagram illustrating an example of spatial propagation to produce a refined semantic feature map according to the principles of the disclosure. The spatial propagation refines pixels of a semantic feature map to produce the refined semantic feature map. For example, the semantic feature map F in FIG. 3 can be refined via spatial propagation to produce refined semantic feature map F* in FIG. 3. FIG. 6B illustrates four spatial propagation modes Mode R, Mode T, Mode L, and Mode B. Each of these different modes of message passing separately generate a hidden state map which can be approximately viewed as a refined (smoothed) version of F, F*. FIG. 6A illustrates a portion of an example of a hidden state map $H^R$ 600 of a channel of a refined semantic feature map that is refined using the Right to Left mode, Mode R. The spatial propagation can be performed by a DGP layer, such as DGP layers 220 and 320 in FIGS. 2 and 3.

A three-way local connection for spatial propagation of Mod R is defined in FIG. 6B, wherein there is a one-to-one correspondence between (i, t) and pixel index (h, w). The mapping can vary for the different propagation modes but can be similarly defined. With such defined spatial propagation, message passing merely needs to be initiated. Considering Mode R, once message passing from the right most column of pixels is initiated, messages from right to left column by column are then recurrently passed. In this case, the hidden state of each pixel is directly influenced by the three immediate neighboring pixels on the right column. For example, three neighboring pixels in column t−1 provide input for smoothing of pixel 610 in column t. In this example, pixel 620 has the greatest affinity value according to the affinity map and will be selected for smoothing subject to gating from the semantic edge map. Similarly, three neighboring pixels in column t−1 provide input for smoothing of pixel 615 in column t. In this case, pixel 625 has the greatest affinity value of the three pixels and is used for smoothing of pixel 615 subject to gating from the semantic edge map.

Figure 7:
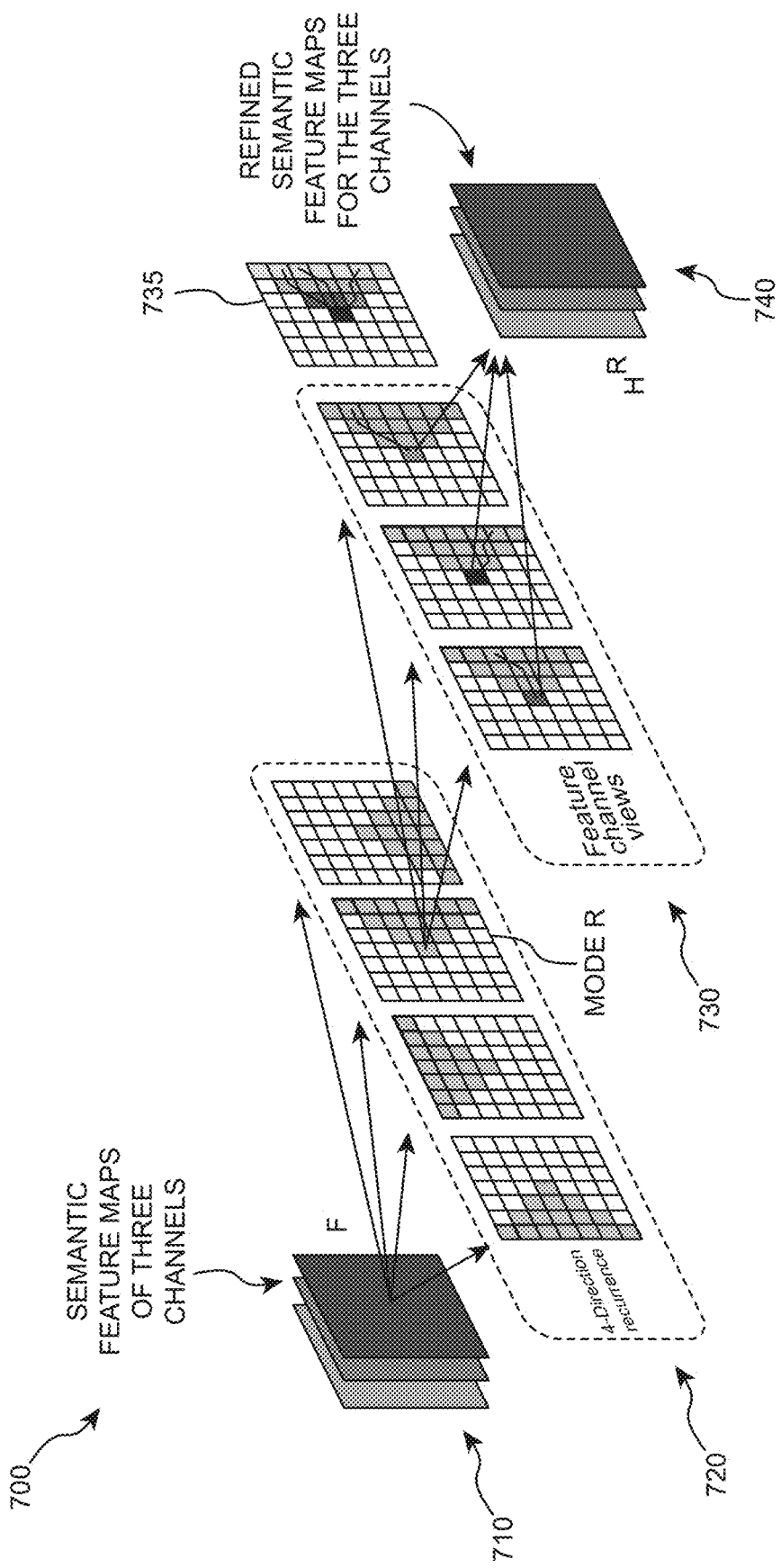
FIG. 7 illustrates operation of a DGP using three layer channels as an example.

FIG. 7 provides a flow diagram 700 illustrating an example of operations of a DGP layer carried out according to the principles of the disclosure. The flow diagram 700 visually illustrates the operation of a DGP layer using three example paths on three feature channels for a pixel. The center pixel of a semantic feature map is used as an example. The flow diagram 700 provides an example of three channels but represents the functionality of architectures having more channels. For example, the steps of the flow diagram 700 are applicable to the architectures of FIGS. 4-5 have semantic feature maps of 128 channels.

In step 710, semantic feature maps are received. The semantic feature maps represent extracted features from an input image on three channels. The semantic feature maps can be received from a feature processing stream of a CNN backbone network, such as represented in FIGS. 2 to 4.

In step 720, spatial propagation is performed to refine the pixels of the semantic feature maps. In FIG. 7, four propagation modes are illustrated with respect to the center pixel for one of the feature maps. Similar propagations occur for each of the pixels of each of the semantic feature maps utilizing all four of the propagation modes: Mode R, Mode L, Mode T, and Mode B. Mode R is denoted in FIG. 7.

Step 730 illustrates different message passing paths for each channel of the semantic feature maps for the center pixel using the propagation Mode R as an example. The other propagation modes for each of the channels are also performed for the center pixel, wherein a different path can also be determined for each of the different modes as represented for Mode R in step 730. Each channel independently takes different paths depending on its own neighbor affinities. Accordingly, a different message passing path can be used in each channel for a single pixel. Map 735 provides an example of the combination of different message paths in the different channels for the center pixel based on step 730.

In step 740, the refined semantic feature maps for the three different channels are provided as an output. The refined semantic feature maps can be provided to a computer vision system and used to perform an automated visual task, such as by image processor 120.

Figure 8:
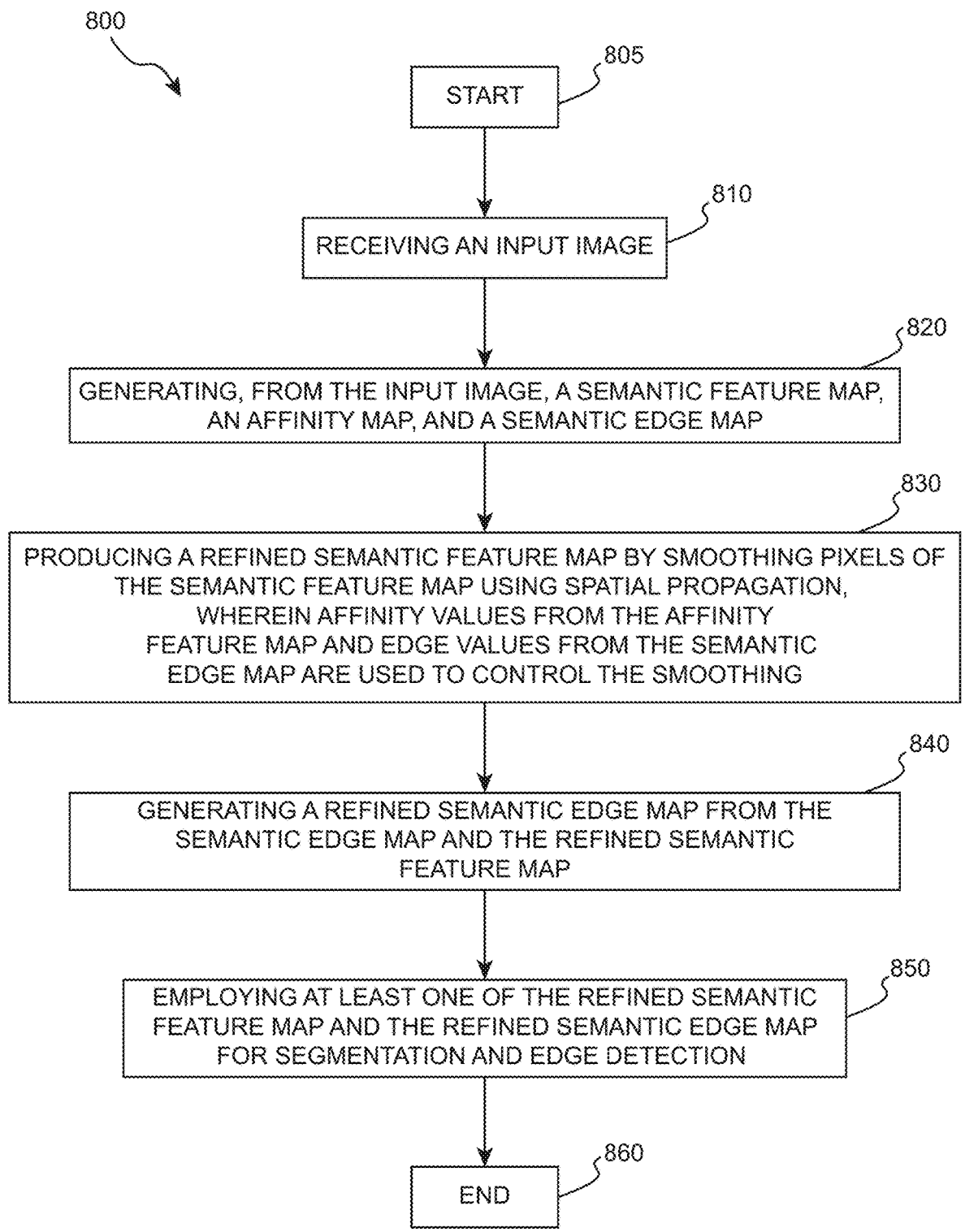
FIG. 8 illustrates a flow diagram of an example method of coupled segmentation and edge learning carried out according to the principles of the disclosure.

FIG. 8 illustrates a flow diagram of an example of a method 800 of processing an image carried out according to the principles of the disclosure. The method 800 advantageously includes coupled segmentation and edge learning for processing the image. The method 800 is directed to processing a single input image but can be repeated for multiple images. The method 800 can be performed by a computer vision system, such as the computer vision system 100. At least a portion of the method 800 can be performed by a processor directed by code corresponding to algorithms for producing refined semantic maps as disclosed herein. At least a portion of the method 800 can be performed utilizing a GPU. The method 800 begins in step 805.

In step 810, an input image is received. The input image can be from a video, a photo, a scanner, a medical scanning device, or another computing device that can take pictures or generate images. The image can be received by a processor that produces refined semantic maps utilizing a single backbone network. The processor can be a CSEL processor that provides a multitasking learning framework for producing the refined semantic maps. Instead of a single image, multiple input images can be received and processed.

From the input image, a semantic feature map, an affinity map, and a semantic edge map are generated in step 820. A single backbone network of a CNN, such as one of the backbone networks of FIG. 3, 4, or 5, can be used to generate each of the maps. Three different processing streams, a feature stream, an affinity stream, and an edge stream, can be used to generate each of the maps, respectively. An example of the different processing streams is discussed with respect to FIG. 3 and shown in the illustrated examples of FIGS. 4 and 5.

The semantic feature map can be generated by encoding segmentation information of the input image that is extracted using a feature extraction network such as a backbone network. The affinity map can be generated by aggregating cross-layer information of the backbone network and encoding an affinity of pairwise neighboring pixels of the input image. The semantic edge map can be generated by combining dense skip-layer features having abundant details with an edge classification layer through shared concatenation.

In step 830 a refined semantic feature map is produced by smoothing pixels of the semantic feature map using spatial propagation. Affinity values from the affinity map and edge values from the semantic edge map can be used to control the smoothing. The affinity values and the edge values can be used as a double-gate for controlling the smoothing.

The spatial propagation can include propagating from four directions for the pixels of the semantic feature map. Different propagation modes can be used for each of the pixels of the semantic feature map, such as Mode R, Mode L, Mode T, and Mode B. One or more of the propagation modes can be used for the refining of the semantic feature map. For example, all four of the modes can be used. The spatial propagation is performed for the semantic feature map of each channel. In the spatial propagation, a single neighboring pixel for each of the pixels of the semantic feature map is selected for the smoothing. As shown in FIGS. 6A and 6B, the different spatial propagation modes can be defined using three neighboring pixels from a previous column to a single pixel of the subsequent column for the smoothing. A learnable recurrent message passing layer, such as the DGP 220 and the DGP 320 of FIGS. 2 and 3, can perform the spatial propagation and utilize the semantic feature map, the affinity map, and the semantic edge map as inputs to produce the refined semantic feature map.

In step 840, a refined semantic edge map is generated from the semantic edge map and the refined semantic feature map. Via convolution operations, the refined semantic feature map can be summed with the semantic feature map to generate the refined semantic feature map.

In step 850, at least one of the refined semantic feature maps and the refined semantic edge map are employed for a computer vision task. The refined semantic feature map can be used for segmentation detection and the refined semantic edge map can be used for edge detection. The computer vision task can be an automated task, such as object detection, image detection, localization, and mapping. The task or function performed utilizing one or both of the refined semantic feature map and the refined semantic edge map can vary depending on the computer vision system that receives the refined semantic maps. The two different refined semantic maps can be utilized to perform different computer vision function by one or more processors. The method 800 continues to step 860 and ends.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/ or read-only memory (ROM), to enable various types of digital data processors or computers to perform one, multiple or all of the steps of one or more of the above-described methods, or functions, systems or apparatuses described herein.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center. The digital data processor or computers can also be part of a computer vision system that is integrated with a robot or an automobile.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip.

The processors or computers can be part of GPU racks located in a data center. The GPU racks can be high-density (HD) GPU racks that include high performance GPU compute nodes and storage nodes. The high-performance GPU compute nodes can be servers designed for general-purpose computing on graphics processing units (GPGPU) to accelerate deep learning applications. For example, the GPU compute nodes can be servers of the DGX product line from Nvidia Corporation of Santa Clara, California.

The compute density provided by the HD GPU racks is advantageous for AI computing and GPU data centers directed to AI computing. The HD GPU racks can be used with reactive machines, autonomous machines, self-aware machines, and self-learning machines that all require a massive compute intensive server infrastructure. For example, the GPU data centers employing HD GPU racks can provide the storage and networking needed to support large-scale deep neural network (DNN) training, such as for the CNNs disclosed herein. With thousands of processing cores that are optimized for matrix math operations, GPUs such as noted above are capable of delivering the performance required for training CNNs for artificial intelligence and machine learning applications.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A processor for coupled segmentation and edge learning, comprising:
   a backbone network configured to generate, from an input image, a semantic feature map, an affinity map, and a semantic edge map; and
   a dynamic graph propagation (DGP) layer configured to produce a refined semantic feature map by smoothing pixels of the semantic feature map, wherein the DGP layer uses affinity values from the affinity map and edge values from the semantic edge map as a double-gate to control the smoothing.

2. The processor as recited in claim 1, wherein the processor is further configured to generate a refined semantic edge map from the semantic edge map and the refined semantic edge map.

3. The processor as recited in claim 1, wherein the DGP layer is configured to select, based on the affinity values, a single neighboring pixel for each of the pixels of the semantic feature map for the smoothing.

4. The processor as recited in claim 1, wherein the DGP layer uses spatial propagation along multiple directions for the smoothing.

5. The processor as recited in claim 1, wherein the semantic feature map includes multiple channels and the DGP layer encodes message passing paths of the pixels for the multiple channels.

6. The processor as recited in claim 5, wherein each of the message passing paths for the multiple channels are independent of the other message passing paths for the other multiple channels.

7. The processor as recited in claim 1, wherein the backbone network uses atrous spatial pyramid pooling layers to capture segmentation information from the input image and encodes the segmentation information to generate the semantic feature map.

8. The processor as recited in claim 1, wherein the backbone network provides inputs to an edge classifier to generate the semantic edge map and generates one of the inputs by applying a sigmoid function on an output of a residual block of the backbone network having a resolution that is one eighth of the input image.

9. The processor as recited in claim 1, where the processor is a convolutional neural network and the DGP layer is a learnable recurrent message passing layer.

10. A method for coupled segmentation and edge learning, comprising:
- receiving an input image;
- generating, from the input image, a semantic feature map, an affinity map, and a semantic edge map from a single backbone network of a convolutional neural network (CNN); and
- producing a refined semantic feature map by smoothing pixels of the semantic feature map using spatial propagation, and controlling the smoothing using both affinity values from the affinity map and edge values from the semantic edge map as a double-gate.

11. The method as recited in claim 10, further comprising generating a refined semantic edge map from the semantic edge map and the refined semantic edge map.

12. The method as recited in claim 10, wherein the producing includes selecting based on the affinity values, a single neighboring pixel for each of the pixels of the semantic feature map for the smoothing.

13. The method as recited in claim 10, wherein the spatial propagation includes propagating from four directions for the pixels of the semantic feature map.

14. The method as recited in claim 10, wherein the producing includes using a learnable recurrent message passing layer that uses the semantic feature map, the affinity map, and the semantic edge map as input to produce the refined semantic feature map.

15. The method as recited in claim 10, wherein generating the semantic feature map includes encoding segmentation information of the input image, generating the affinity map includes aggregating cross-layer information of the backbone network and encoding an affinity of pairwise neighboring pixels of the input image, and generating the semantic edge map includes combining dense skip-layer features with abundant details with edge classification layer through shared concatenation.

16. A system, comprising:
- an image processor configured to perform a visual task based on at least one refined semantic map from an input image; and
- a coupled segmentation and edge learning (CSEL) processor configured to produce the at least one refined semantic map by smoothing pixels of a semantic feature map using a dynamic graph propagation (DGP) layer, wherein the DGP layer is a learnable recurrent message passing layer that uses both affinity values and edge values extracted from the input image as a double-gate to control the smoothing.

17. The system as recited in claim 16, wherein the at least one refined semantic map is a refined semantic feature map or a refined semantic edge map.

18. The system as recited in claim 16, wherein the CSEL processor is configured to produce both a refined semantic feature map and a refined semantic edge map.

* * * * *

UNITED STATES PATENT AND TRADEMARK OFFICE
CERTIFICATE OF CORRECTION

PATENT NO. : 11,790,633 B2  
APPLICATION NO. : 17/365877  
DATED : October 17, 2023  
INVENTOR(S) : Zhiding Yu et al.

Page 1 of 1

It is certified that error appears in the above-identified patent and that said Letters Patent is hereby corrected as shown below:

In the Specification

In Column 6, Line 57, after --layers-- delete "(cony" and insert --(conv--

In Column 7, Line 56, after --layers-- delete "(cony" and insert --(conv--

Signed and Sealed this  
Twenty-sixth Day of December, 2023

Katherine Kelly Vidal  
*Director of the United States Patent and Trademark Office*